（12） United States Patent
Mullins

(10) Patent No.: US 11,678,004 B2
(45) Date of Patent: *Jun. 13, 2023

(54) RECORDING REMOTE EXPERT SESSIONS

(71) Applicant: RPX Corporation, San Francisco, CA (US)

(72) Inventor: Brian Mullins, Altadena, CA (US)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,973

(22) Filed: Feb. 4, 2022

(65) Prior Publication Data

US 2022/0264173 A1 Aug. 18, 2022

Related U.S. Application Data

(63) Continuation of application No. 17/302,608, filed on May 7, 2021, now Pat. No. 11,277,655, which is a continuation of application No. 16/222,275, filed on Dec. 17, 2018, now Pat. No. 11,032,603, which is a continuation of application No. 15/468,476, filed on Mar. 24, 2017, now Pat. No. 10,187,686.

(60) Provisional application No. 62/312,823, filed on Mar. 24, 2016.

(51) Int. Cl.
*H04N 21/43* (2011.01)
*H04N 21/4223* (2011.01)
*H04N 21/81* (2011.01)
*H04N 21/61* (2011.01)
*H04N 21/242* (2011.01)

(52) U.S. Cl.
CPC ....... *H04N 21/4302* (2013.01); *H04N 21/242* (2013.01); *H04N 21/4223* (2013.01); *H04N 21/6106* (2013.01); *H04N 21/816* (2013.01)

(58) Field of Classification Search
None
See application file for complete search history.

(56) References Cited

U.S. PATENT DOCUMENTS 6,630,963 B1 10/2003 Billmaier
6,941,248 B2 9/2005 Friedrich et al.
7,715,037 B2 5/2010 Castellani et al.
(Continued)

OTHER PUBLICATIONS

"U.S. Appl. No. 15/468,476, Non Final Office Action dated Mar. 8, 2018", 12 pgs.
(Continued)

*Primary Examiner* — William J Kim
(74) *Attorney, Agent, or Firm* — Schwegman Lundberg & Woessner, P.A.

(57) ABSTRACT

A server receives, from a first display device of a first user, first content data, first sensor data, and a request for assistance identifying a context of the first display device. The server identifies a second display device of a second user based on the context of the first display device. The server receives second content data and second sensor data from the second display device. The first content data is synchronized with the second content data based on the first and second sensor data. Playback parameters are formed based on the context of the first display device. An enhanced playback session is generated using the synchronized first and second content data in response to determining that the first sensor data meet the playback parameters. The enhanced playback session is communicated to the first display device.

20 Claims, 12 Drawing Sheets

(56) References Cited

U.S. PATENT DOCUMENTS

| | | |
|---|---|---|
| 8,102,253 B1 | 1/2012 | Brady, Jr. |
| 8,918,087 B1 | 12/2014 | Paczkowski et al. |
| 9,408,537 B2 | 8/2016 | Schroeter et al. |
| 10,187,686 B2 | 1/2019 | Mullins |
| 11,032,603 B2 | 6/2021 | Mullins |
| 11,277,655 B2 | 3/2022 | Mullins |
| 2002/0049566 A1 | 4/2002 | Friedrich et al. |
| 2005/0182650 A1 | 8/2005 | Maddox et al. |
| 2009/0189981 A1 | 7/2009 | Siann et al. |
| 2010/0125182 A1 | 5/2010 | Schroeter et al. |
| 2010/0302143 A1 | 12/2010 | Spivack |
| 2011/0053642 A1 | 3/2011 | Lee |
| 2011/0164163 A1 | 7/2011 | Bilbrey et al. |
| 2011/0216179 A1 | 9/2011 | Dialameh et al. |
| 2012/0127284 A1 | 5/2012 | Bar-zeev et al. |
| 2012/0293506 A1 | 11/2012 | Vertucci et al. |
| 2013/0044128 A1 | 2/2013 | Liu et al. |
| 2013/0083063 A1 | 4/2013 | Geisner et al. |
| 2013/0093829 A1 | 4/2013 | Rosenblatt et al. |
| 2013/0095924 A1 | 4/2013 | Geisner et al. |
| 2013/0297218 A1 | 11/2013 | Bangera et al. |
| 2014/0016820 A1 | 1/2014 | Roberts et al. |
| 2014/0176661 A1 | 6/2014 | Smurro et al. |
| 2014/0320529 A1 | 10/2014 | Roberts et al. |
| 2015/0067018 A1 | 3/2015 | Connolly et al. |
| 2015/0317836 A1 | 11/2015 | Beaurepaire et al. |
| 2016/0049004 A1 | 2/2016 | Mullins et al. |
| 2016/0077522 A1 | 3/2016 | Endrerud et al. |
| 2016/0094936 A1 | 3/2016 | Yang et al. |
| 2016/0103437 A1 | 4/2016 | Alfredsson et al. |
| 2016/0253563 A1 | 9/2016 | Lam et al. |
| 2016/0343168 A1 | 11/2016 | Mullins et al. |
| 2017/0092220 A1 | 3/2017 | Mullins et al. |
| 2017/0280188 A1 | 9/2017 | Mullins |
| 2019/0124391 A1 | 4/2019 | Mullins |
| 2021/0266628 A1 | 8/2021 | Mullins |

OTHER PUBLICATIONS

"U.S. Appl. No. 15/468,476, Notice of Allowance dated Sep. 27, 2018", 11 pgs.

"U.S. Appl. No. 15/468,476, Response filed Jun. 7, 2018 to Non-Final Office Action dated Mar. 8, 2018", 10 pgs.

"U.S. Appl. No. 16/222,275, Examiner Interview Summary dated Sep. 9, 2020", 3 pgs.

"U.S. Appl. No. 16/222,275, Examiner Interview Summary dated Dec. 28, 2020", 3 pgs.

"U.S. Appl. No. 16/222,275, Non Final Office Action dated Apr. 3, 2020", 31 pgs.

"U.S. Appl. No. 16/222,275, Non Final Office Action dated Sep. 23, 2020", 26 pgs.

"U.S. Appl. No. 16/222,275, Notice of Allowance dated Feb. 8, 2021", 9 pgs.

"U.S. Appl. No. 16/222,275, Preliminary Amendment filed Jan. 2, 2019", 7 pgs.

"U.S. Appl. No. 16/222,275, Response filed Sep. 3, 2020 to Non Final Office Action dated Apr. 3, 2020", 14 pgs.

"U.S. Appl. No. 16/222,275, Response filed Dec. 21, 2020 to Non Final Office Action dated Sep. 23, 2020", 13 pgs.

"U.S. Appl. No. 17/302,608, Non Final Office Action dated Sep. 23, 2021", 15 pgs.

"U.S. Appl. No. 17/302,608, Notice of Allowance dated Jan. 18, 2022", 8 pgs.

"U.S. Appl. No. 17/302,608, Response filed Dec. 22, 2021 to Non Final Office Action dated Sep. 23, 2021", 9 pgs.

RECORDING REMOTE EXPERT SESSIONS

REFERENCE TO RELATED APPLICATION

The application is a continuation of, and claims the benefit of priority of U.S. patent application Ser. No. 17/302,608 filed May 7, 2021, which is a continuation of, and claims the benefit of priority of U.S. patent application Ser. No. 16/222,275 filed Dec. 17, 2018, which is a continuation of, and claims the benefit of priority of U.S. patent application Ser. No. 15/468,476 filed Mar. 24, 2017, which claims the benefit of priority of U.S. Provisional Application No. 62/312,823 filed Mar. 24, 2016, which are herein incorporated by reference in their entireties.

TECHNICAL FIELD

The subject matter disclosed herein generally relates to the processing of data. Specifically, the present disclosure addresses systems and methods for recording and playing back interaction sessions using augmented reality display devices.

BACKGROUND

Augmented reality (AR) devices can be used to generate and display data in addition to an image captured with the AR devices. For example, AR provides a live, direct or indirect, view of a physical, real-world environment whose elements are augmented by computer-generated sensory input such as sound, video, graphics or GPS data. With the help of advanced AR technology (e.g. adding computer vision, object recognition, and other complementary technologies), the information about the surrounding real world of the user becomes interactive. Device-generated (e.g., artificial) information about the environment and its objects can be overlaid on the real world.

AR devices can be used to provide enhanced assistance (e.g., technical support) to other users via human interaction, and customized data generated for the specific time and issue where assistance is needed. However, access to the right assistance can be dependent on unreliable connectivity and the availability of a qualified expert to provide that interaction and information.

BRIEF DESCRIPTION OF THE DRAWINGS

Some embodiments are illustrated by way of example and not limitation in the figures of the accompanying drawings.

DETAILED DESCRIPTION

Figure 1A:
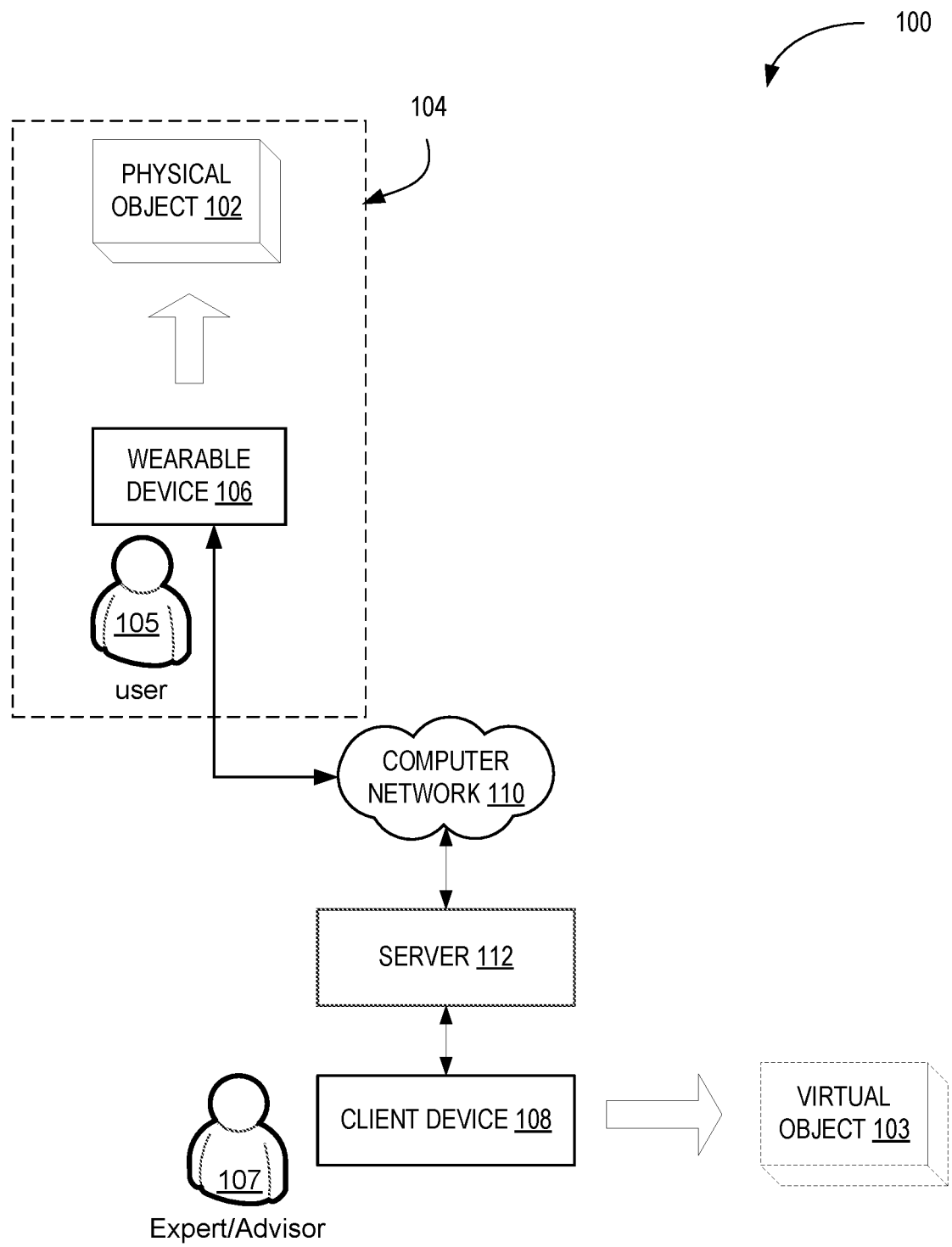
FIG. 1A is a block diagram illustrating an example of a network suitable for recording a remote expert session, according to some example embodiments.

Example methods and systems are directed to recording an interactive session with an expert user/advisor using augmented reality applications. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience information, such as in the form of a three-dimensional virtual object overlaid on an image of a physical object captured by a camera of a display device (e.g., mobile computing device, wearable computing device such as a head mounted device). The physical object may include a visual reference (e.g., an identifiable visual feature) that the augmented reality application can identify. A visualization of the additional information, such as the three-dimensional virtual object overlaid or engaged with an image of the physical object, is generated in a display of the device. The three-dimensional virtual object may selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object or a two-dimensional virtual object. For example, the three-dimensional virtual object may include a three-dimensional view of a chair. The two-dimensional virtual object may include a two-dimensional view of a dialog box, a menu, or written information such as statistics information for a factory tool. An image of the virtual object may be rendered at the display device.

One example of an AR application is to enable a remote expert session that allows a user of a wearable device (e.g., AR display device) to request help and access assistance from another user (e.g., also referred to as "an expert user"—the expert user may be more knowledgeable) on a remote system (e.g., desktop computer, or another wearable device). The remote expert session may include a playback of an expert's video feed or an animation of a virtual object manipulation. The remote expert session may also be referred to as an enhanced playback session in the present description. In one example embodiment, an AR device of a user transmits their camera feed and sensor data to the client device of a remotely located user (e.g., an "expert" or "advisor"). The expert can in turn send back a video feed of himself/herself, example original content recorded at the device of the expert, and annotations on the original user's screen to assist the user in performing an arbitrary task, such as changing an air filter of a physical machine or media examples such as video clips or images.

In an example embodiment, the information (e.g., content data, sensor data) from the expert and the user is recorded and synchronized for playback, or to be used for training purposes. The content data includes, for example, video, images, thermal data, biometric data, user and application input, graphics, audio, annotations, AR manipulation, graphics animation, or the like. The sensor data includes, for example, geographic location, inertia measurement, position and location of the display device, user identification, expert identification, task identification, physical object identification, nearby machine identification, or the like. The remote expert session (or user session) is formed based on the data streams from the user device (e.g., wearable device) and the expert device (e.g., client), and the sensor data from the user device and the expert device.

Playback parameters for the remote expert session are generated to identify conditions under which the remote expert session playback is compatible. For example, a remote expert session is triggered and retrieved when the user of the display device is identified to be an electrical technician fixing a transformer of a machine located at a particular location. The remote expert session may be triggered based on the identity of the user, the geographic location of the machine (e.g., located on first floor in building A), the condition of the machine (e.g., defective, non-responsive), the task to be performed (e.g., repair, scheduled maintenance, unscheduled maintenance), the level of experience of the user (e.g., apprentice). For example, a video or an animation showing how to fix or repair a machine may be displayed in the display device when an apprentice level user approaches a defective machine. The remote expert session may be recreated based on the recorded content data and sensor data from previous users and expert users. For example, previously recorded sessions can be synchronized via multiple methods, such as time-based method (e.g., starts at t0 and plays for 10 seconds) or spatial-based method (the scene/data/information is displayed when user is in position x-y-z). The content data and sensor data is sent to one or more servers that catalog and store the data. A data retrieval endpoint (e.g., server) allows for access to that data either partially or in full to allow for the session to be recreated or for the metrics to be analyzed (e.g., analytics).

In one example embodiment, a server receives data related to a physical object (e.g., part of a machine) within a field of view of an AR device of a first user (e.g., user repairing the machine). The server generates a virtual object (e.g., virtual part of the machine) corresponding to the physical object. The server communicates data representing the virtual object to the AR device of a second user (e.g., the expert user related to the machine or a task of the first user). In another example, the server receives a video feed from the first user and relays the video feed to a device of the second user. The second user can manipulate the virtual object rendered at the AR device of the second user, annotate the video feed by providing, for example, audio comments or digital files, and generate a video feed of the second user operating on another machine similar to the physical object within the field of view of the AR device. The server receives data related to the annotation, comments, or original video feed from the AR device of the second user. Furthermore, the server receives sensor data related to the AR device of the second user. The server aggregates the data stream from different sources (e.g., the AR devices of the first and second user) and catalogs the data for later access. The server further synchronizes the data stream based on the sensor data or manual input from either user and generates playback parameters (e.g., trigger conditions). The expert session can be recreated at the first display device or on a separate display device at a later time In another example embodiment, the server identifies a manipulation of virtual objects displayed at the AR device of the second user. The virtual objects are rendered based on a physical object detected (e.g., within a field of view) by the AR device of the first user. The virtual objects are displayed in the display device of the second user. The server records the manipulation of the virtual objects received from the display device of the second user. The server generates an expert session that includes a visualization of the manipulation of the virtual objects for display at the AR device of the first user.

In another example embodiment, the server receives a video feed, location information, and orientation information from a first AR device. The server identifies the physical object from the video feed. The server generates a three-dimensional model of the virtual object based on the identification of the physical object. The server communicates the three-dimensional model of the virtual object to a second AR device. The second AR device renders the three-dimensional model of the virtual object in a display of the second AR device. In another example, the server receives a request for assistance from the second AR device. The request for assistance is related to the physical object. The server identifies a user of the second AR device as an expert related to the physical object.

In one example embodiment, the manipulation of a physical object comprises a modification of an existing component of the object (e.g., a switch on a wall), an addition of a new component to the object (e.g., a nail in a wall), or a removal of an existing component of the object (e.g., a handle from a door).

Object recognition is performed on the video feeds to identify a component on the object (e.g. nails on a wall). Dynamic status may include an identification of a type of manipulation or action on the object using key states or properties (e.g., unhammered nail, painted surface, gluing phase, hammering phase, etc.), an identification of a tool used in the manipulation of the object (e.g., hammer, saw, etc.), a location of the manipulation relative to the three-dimensional model of the object (e.g., nails hammered on the side panel of a boat), and an identification of the wearable device associated with the manipulation of the object (e.g., user of wearable device A is the one using the hammer).

Reference data may include a three-dimensional model of a reference object (e.g., boat, car, building), a reference process (e.g., phase 3 is to build the frame, phase 4 is to install plumbing) for completing the reference object (e.g., a house), and a reference compliance related to the reference process (e.g., there should be four brackets or braces per beam, there should be one outlet per location or drywall).

In another example embodiment, a non-transitory machine-readable storage device may store a set of instructions that, when executed by at least one processor, causes the at least one processor to perform the method operations discussed within the present disclosure.

FIG. 1A is a network diagram illustrating a network environment 100 suitable for operating a server 112 (e.g., remote expert server) in communication with a wearable device 106 (e.g., AR display device such as a head mounted device) and a client device 108 (e.g., desktop computer), according to some example embodiments. The network environment 100 includes the wearable device 106, the client device 108, and the server 112, communicatively coupled to each other via a computer network 110. The wearable device 106, client device 108, and the server 112 may each be implemented in a computer system, in whole or in part, as described below with respect to FIGS. 8 and 9. The server 112 may be part of a network-based system. For example, the network-based system may be or include a cloud-based server system that provides additional information, such as three-dimensional models and locations of components or items relative to the three-dimensional models, to the wearable device 106 and the client device 108.

The wearable device 106 may be worn or held by a user 105 viewing a physical object 102 at a location 104. For example, the user 105 may be a construction worker for a building. The user 105 is not part of the network environment 100, but is associated with the corresponding wearable device 106. For example, the wearable device 106 may be a computing device with a display, such as a head-mounted computing device with a display and a camera. The display and camera may be disposed on separate devices but may be communicatively connected. The wearable device 106 may also be hand held or may be temporarily mounted on a head of the user 105. In one example, the display may be a screen that displays what is captured with a camera of the wearable device 106. In another example, the display of the wearable device 106 may be at least transparent, such as lenses of computing glasses. The display may be non-transparent and wearable by the user 105 to cover the field of view of the user 105.

For example, the physical object 102 may be a machine that is to be repaired. The user 105 may point a camera of the wearable device 106 at the physical object 102 and capture an image of the physical object 102. The image is tracked and recognized locally in the wearable device 106 using a local database such as a context recognition dataset module of the augmented reality application of the wearable device 106. The local context recognition dataset module may include a library of virtual objects associated with real-world physical objects 102 or references. The augmented reality application then generates additional information corresponding to the image (e.g., a three-dimensional model) and presents this additional information in a display of the wearable device 106 in response to identifying the recognized image. If the captured image is not recognized locally at the wearable device 106, the wearable device 106 downloads additional information (e.g., the three-dimensional model) corresponding to the captured image from a database at the server 112 over the computer network 110.

The wearable device 106 may be used to capture video and images from different angles of the physical object 102. Other sensor data may be captured, such as data generated by structured light. In one example embodiment, the wearable device 106 may broadcast a video feed of what the user 105 is looking at to the server 112. In another example, the wearable device 106 captures frames or images at periodic intervals and broadcasts them to the server 112. In another example, the wearable device 106 broadcasts images at regular intervals and/or based on its geographic location relative to the physical object 102. For example, images may be captured in a sequential pattern such as when the user 105 walks clockwise or counter-clockwise around the physical object 102. Other examples include combination of image capture and video feed from the wearable device 106. The pattern of video/image capture may alternate based on the movement, location 104, and orientation of the wearable device 106. For example, if the wearable device 106 is looking away from the physical object 102, the rate of capture may be decreased or no image may be captured.

Data received from the wearable device 106 may be provided to a computer vision object recognition application at the server 112 system for identifying objects in images and video frames. In one embodiment, an object recognition application may be part of the server 112.

The user 105 of the wearable device 106 may attempt to fix the physical object 102 (e.g., air conditioner unit) and may require assistance from an expert in the field of air conditioning units based on the brand or type of air conditioning unit as identified by the wearable device 106. The user 105 of the wearable device 106 may request the server 112 for assistance. The server 112 may identify an expert 107 (e.g., a user with expertise) related to the physical object 102 (or related to the context of the user 105—such as an expert 107 associated with a task of the user 105, the location 104) and communicate data such as the virtual objects' models to the client device 108 of the expert 107.

The client device 108 can display an image or video of the physical object 102 and generate a display of virtual objects (e.g., virtual object 103) associated with the physical object 102 viewed by the wearable device 106. The client device 108 may view the virtual object 103 in relation to the physical object 102. For example, the client device 108 may view a virtual air conditioning unit similar to the physical air conditioning unit of physical object 102. The three-dimensional model of the virtual object 103 may be viewed from different perspectives as the expert 107 adjusts a point of view or "moves" around the similar virtual air conditioning unit. The client device 108 detects the expert 107 manipulating the virtual object 103 and communicates those manipulations to the server 112. For example, the client device 108 captures the expert 107 turning off a virtual switch and then flipping a virtual cover of a virtual air conditioning unit.

In another example, the client device 108 receives a video feed from the wearable device 106. The client device 108 generates annotations (e.g., audio/video comments) on the video feed and provides the annotations to the server 112. Each audio/video comment is associated with a particular segment or portion of the video feed. The server 112 stores the audio/video comments and identification data for the corresponding portions of the video feed. In another example, the expert 107 of the client device 108 generates original content (e.g., a video, an animation, audio content) related the virtual object 103.

Figure 1B:
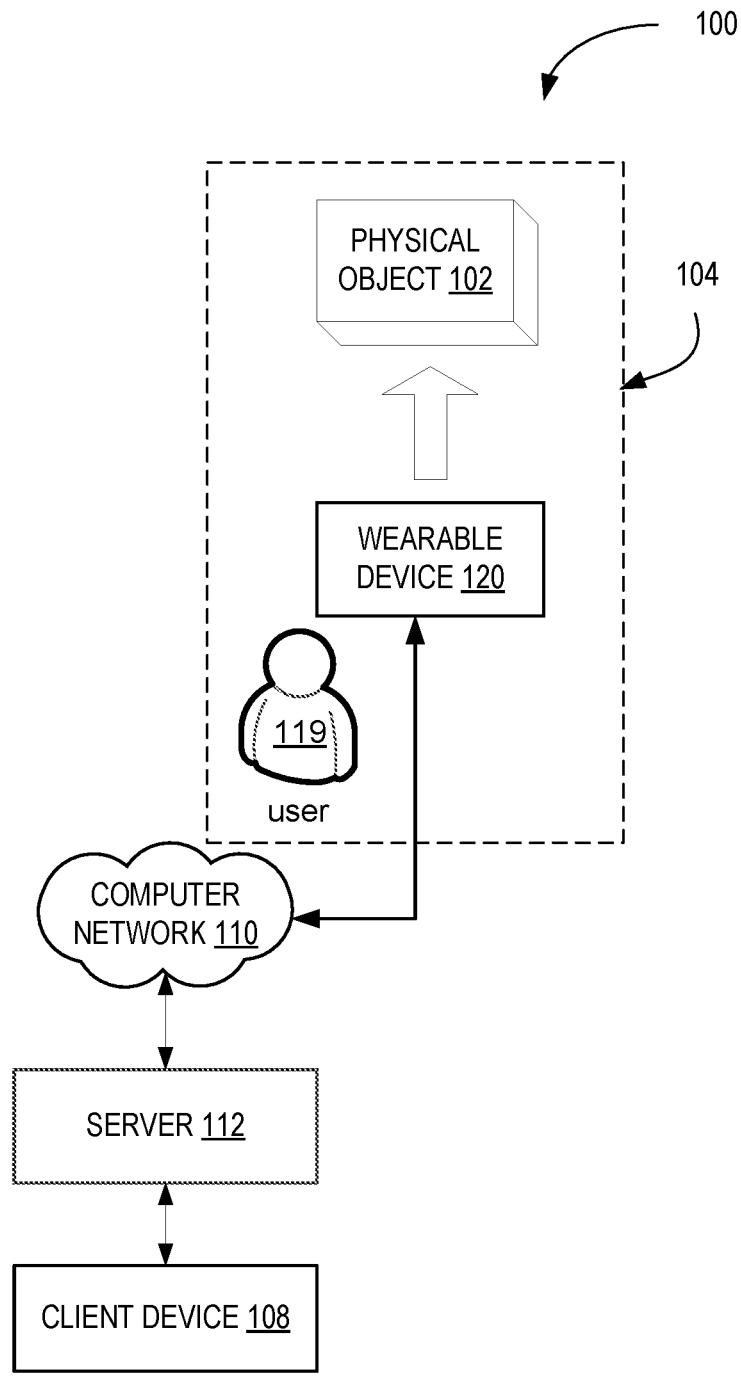
FIG. 1B is a block diagram illustrating an example of a network suitable for playing back a remote expert session, according to some example embodiments.

The server 112 receives content data and sensor data from the devices 106, 108. The server 112 generates playback content based on the content data and sensor data. The playback content includes, for example, video feed from the client device 108, annotated video feed, animations or manipulations of the virtual object 103 corresponding to the physical object 102, and original content (e.g., audio/video content) from the client device 108. The server 112 also computes playback parameters for the playback content. The playback parameters may be based on the sensor data from the devices 106, 108. The playback parameters include, for example, a geographic location (e.g., the location 104), an identification of the type of physical object 102 (e.g., a specific type of machine), a task related to the physical object 102 (e.g., replacing a component of a machine, performing an inspection), and an identity of the user 105 (e.g., entry-level technician). For example, the playback content associated with a particular task related to the physical object 102 is triggered when a wearable device 120 of a user 119 is detected at the location 104 or is within a predefined distance or range (e.g., a few feet) of the physical object 102 as illustrated in FIG. 1B.

In one example embodiment, the wearable device 106 may offload some processes (e.g., tracking and rendering of virtual objects 103 to be displayed in the wearable device 106) using the tracking sensors and computing resources of the server 112. The tracking sensors may be used to track the location 104 and orientation of the wearable device 106 externally without having to rely on the sensors internal to the wearable device 106. The tracking sensors may be used additively or as a failsafe/redundancy or for fine tuning. The tracking sensors may include optical sensors (e.g., depth-enabled 3D cameras), wireless sensors (e.g., Bluetooth, WiFi), GPS sensors, biometric sensors, and audio sensors to determine the location 104 of the user 105 with the wearable device 106, distances between the user 105 and the tracking sensors in the physical environment (e.g., sensors placed in corners of a venue or a room), or the orientation of the wearable device 106 to track what the user 105 is looking at (e.g., direction at which the wearable device 106 is pointed).

The computing resources of the server 112 may be used to determine and render the virtual object 103 based on the tracking data (generated internally with the wearable device 106 or externally with the tracking sensors). The augmented reality rendering is therefore performed on the server 112 and streamed back to the corresponding wearable device 106, 108. Thus, the devices 106, 108 do not have to compute and render any virtual object 103 and may display the already rendered virtual object 103 in a display of the corresponding wearable device 106, 108. For example, the augmented reality rendering may include a location 104 of where a handle is to be installed per architectural specifications or city code.

In another embodiment, data from the tracking sensors may be used for analytics data processing at the server 112 for analysis of how the user 105 is interacting with the physical environment. For example, the analytics data may track at what locations (e.g., points or features) on the physical 102 or virtual object 103 the user 105 has looked, how long the user 105 or the expert 107 has looked at each location on the physical 102 or virtual object 103, how the user 105 or the expert 107 held the wearable device 106, 108 when looking at the physical 102 or virtual object 103, which features of the virtual object 103 the user 105 or the expert 107 interacted with (e.g., whether a user 105 tapped on a link in the virtual object 103), and any suitable combination thereof. For example, the client device 108 receives a visualization content dataset related to the analytics data.

Any of the machines, databases, or devices shown in FIGS. 1A and 1B may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 8 and 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIGS. 1A and 1B may be combined into a single machine, and the functions described herein for any single machine, database, or device may be subdivided among multiple machines, databases, or devices.

The computer network 110 may be any network that enables communication between or among machines (e.g., the server 112), databases, and devices 106, 108. Accordingly, the computer network 110 may be a wired network, a wireless network (e.g., a mobile or cellular network), or any suitable combination thereof. The computer network 110 may include one or more portions that constitute a private network, a public network (e.g., the Internet), or any suitable combination thereof.

Figure 2:
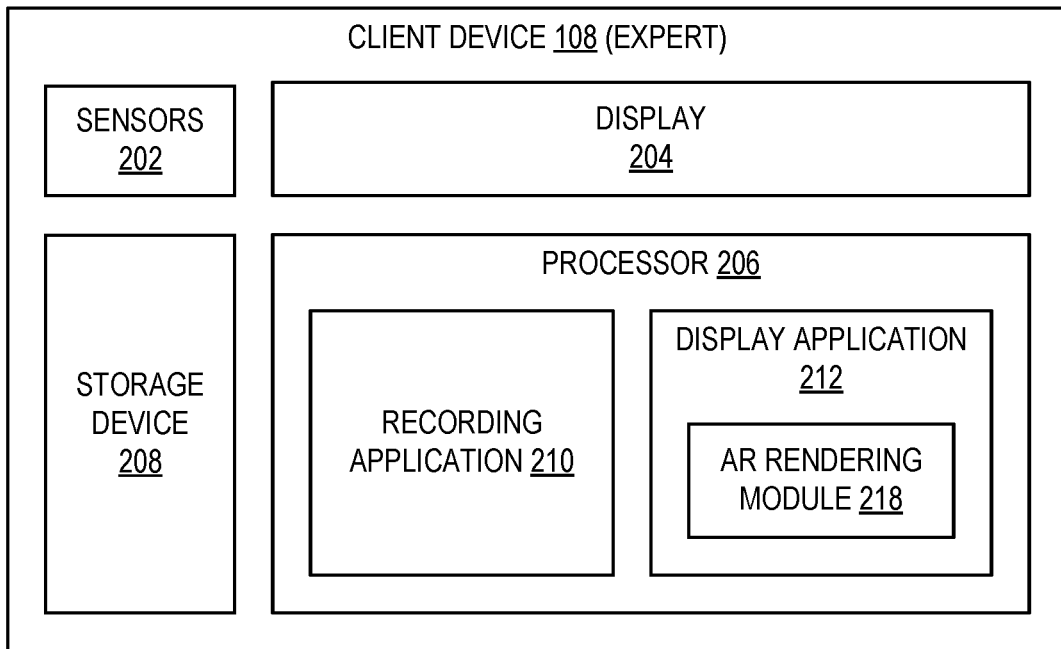
FIG. 2 is a block diagram illustrating an example embodiment of modules (e.g., components) of a device associated with an expert user.

FIG. 2 is a block diagram illustrating modules (e.g., components) of a client device 108, according to some example embodiments. The client device 108 may include sensors 202, a display 204, a processor 206, and a storage device 208. For example, the client device 108 may be a computing device, a tablet computer, or a smart phone.

The sensors 202 may include, for example, a proximity or location sensor (e.g, near field communication, GPS, Bluetooth, WiFi), an optical sensor (e.g., a camera), an orientation sensor (e.g., a gyroscope, inertial measurement unit), an audio sensor (e.g., a microphone), or any suitable combination thereof. It is noted that the sensors 202 described herein are for illustration purposes only and the sensors 202 are thus not limited to the ones described. The sensors 202 may be configured to capture video and audio of the expert 107.

The display 204 may include, for example, a touchscreen display configured to receive user input via a contact on the touchscreen display. In one example, the display 204 may include a screen or monitor configured to display images generated by the processor 206.

The processor 206 may include a recording application 210 and a display application 212. The recording application 210 identifies and records the manipulation of the virtual object 103 displayed in the display 204. For example, the recording application 210 identifies a physical movement of a finger of the expert 107 of the client device 108 relative to the virtual object 103. For example, as the expert 107 views the virtual object 103, he may use his finger (or any human-to-computer interface) to manipulate and move the virtual object 103 by placing his fingers/hands "on top" of the virtual object 103. The recording application 210 determines that the expert 107 may wish to move, change, or rotate based on, for example, the placement of the fingers of the expert 107. Other physical gestures may include waving hands, or moving a hand in a particular pattern or direction. In other embodiments, the recording application 210 displays a video feed from the wearable device 106 and records annotations from the expert 107 on the video feed. The recording application 210 is described in more detail below with respect to FIG. 3.

The display application 212 generates augmented data in the display 204. The augmented data may include the virtual object 103. In one example embodiment, the display application 212 may include an augmented reality (AR) rendering module 218. The AR rendering module 218 displays a three-dimensional model (e.g., the virtual object 103). The AR rendering module 218 retrieves the three-dimensional model of the virtual object 103 in relation to a reference object that may be different from the physical object 102. For example, the reference object may be associated with the physical object 102 and may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object 103 (e.g., an image that has been previously determined to correspond to the three-dimensional virtual object 103).

The storage device 208 may be configured to store a database of visual references (e.g., images) and corresponding experiences (e.g., three-dimensional virtual objects 103, interactive features of the three-dimensional virtual objects 103). For example, the visual reference may include a machine-readable code or a previously identified image (e.g., a picture of machine). The previously identified image of the machine may correspond to a three-dimensional virtual model of the machine that can be viewed from different angles by manipulating the position of the client device 108 relative to the picture of the machine. Features of the three-dimensional virtual machine may include selectable icons on the three-dimensional virtual model of the machine. An icon may be selected or activated by tapping or moving on the client device 108. In one example embodiment, the storage device 208 may store a three-dimensional model of the physical object 102.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of the most popular images determined by the server 112. For example, the core set of images may include images depicting covers of the ten most popular magazines and their corresponding experiences (e.g., virtual objects 103 that represent the ten most popular magazines). In another example, the server 112 may generate the core set of images based on the most popular or often scanned images received by the server 112. Thus, the primary content dataset does not depend on objects or images scanned by the sensors 202 of the client device 108.

The contextual content dataset includes, for example, a second set of images and corresponding experiences (e.g., three-dimensional virtual object models) retrieved from the server 112. For example, images captured with the client device 108 that are not recognized in the primary content dataset are submitted to the server 112 for recognition. If the captured image is recognized by the server 112, a corresponding dataset may be downloaded by the client device 108 and stored in the contextual content dataset. Thus, the contextual content dataset relies on the context in which the client device 108 has been used. As such, the contextual content dataset depends on objects or images scanned by the AR rendering module 218.

Figure 3:
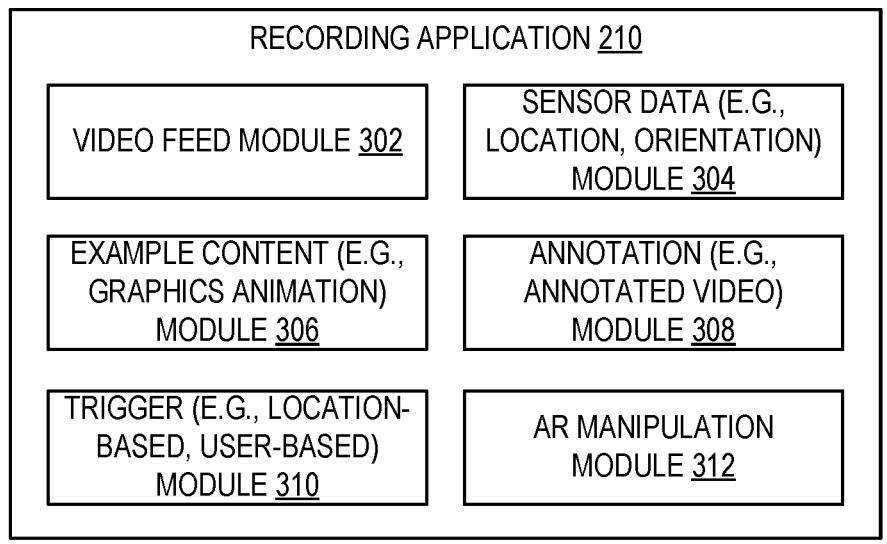
FIG. 3 is a block diagram illustrating an example embodiment of modules (e.g., components) of a recording application.

FIG. 3 is a block diagram illustrating an example embodiment of modules (e.g., components) of the recording application 210. The recording application 210 includes, for example, a video feed module 302, a sensor data module 304, an example content module 306, an annotation module 308, a trigger module 310, and an AR manipulation module 312.

The video feed module 302 generates a video feed from the wearable device 106 at the client device 108. The expert 107 can view a live video from the wearable device 106. In another example, the video feed module 302 retrieves previously stored video data at the server 112.

The sensor data module 304 records sensor data from the sensors 202 of the client device 108. Examples of sensor data include geographic location, position, orientation, inertia measurements, biometric data of the expert 107, and identity of the expert 107.

The example content module 306 records graphics animation or video generated at the client device 108. For example, the graphics animation may be based on the expert 107 manipulating the virtual object 103 or a physical object similar to (e.g., same shape, size, model, color, and the like) or associated with the physical object 102. The example content module 306 can record a video of the expert 107 showing how the expert 107 repairs the virtual object 103 or the physical object 102.

The annotation module 308 generates annotations for a video feed from the wearable device 106. For example, the expert 107 may narrate instructions while watching the video feed from the wearable device 106. The expert 107 may further provide visual annotations on the video feed from the wearable device 106 with visual indicators such as virtual arrows. The visual indicators may be inserted using different user interface means (e.g., audio, tactile, gestures, touch interface).

The trigger module 310 generates playback parameters so that a user 105 or wearable device 106 meeting the playback parameters triggers a playback of the expert recording (e.g., animation, annotated video). For example, the trigger module 310 forms the playback parameters based on the sensor data (e.g., geographic location, type of machine, task to be performed, user identification) from the devices 106, 108.

The AR manipulation module 312 records the expert 107 manipulating the virtual object 103. For example, the expert 107 interacts and moves components of the virtual object 103 to demonstrate steps on how to repair the physical object 102 associated with the virtual object 103. The client device 108 detects the expert 107's interaction with the virtual object 103 using sensors 202. For example, the client device 108 detects that the expert 107 is pointing, or grasping a particular component or part of the virtual object 103. Other examples of AR manipulations include visual gestures (e.g., the expert 107 is waving in a particular direction or moving his/her hands/fingers in a predefined pattern).

Figure 4:
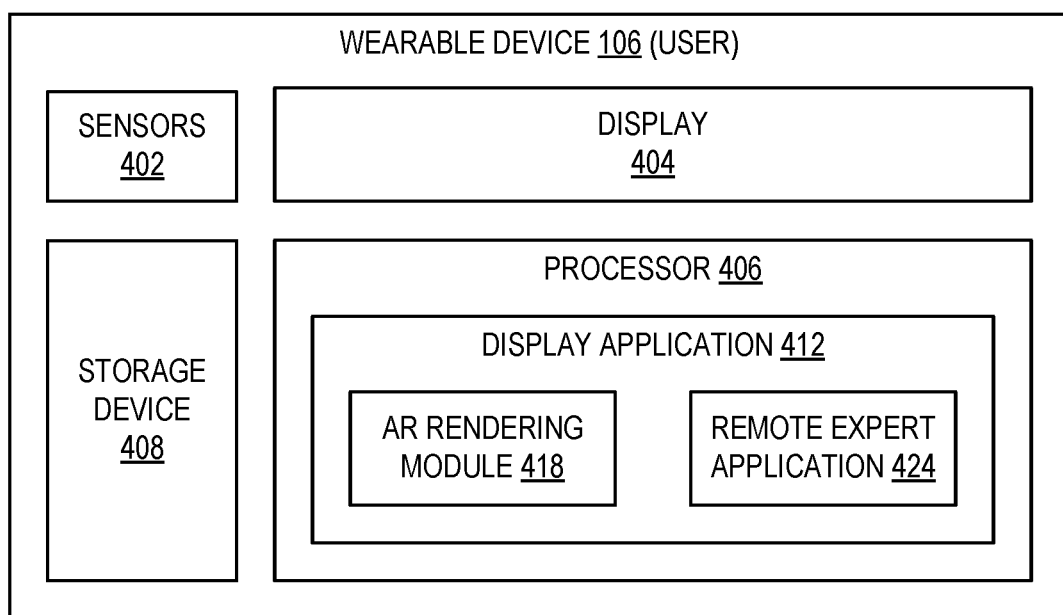
FIG. 4 is a block diagram illustrating an example embodiment of a wearable device.

FIG. 4 is a block diagram illustrating modules (e.g., components) of the wearable device 106 (of the user 105), according to some example embodiments. The wearable device 106 includes sensors 402, a display 404, a processor 406, and a storage device 408. The wearable device 106 includes, for example, a computing device, a tablet computer, or a smart phone of a user 105.

The sensors 402 include, for example, a proximity or location sensor (e.g, near field communication, GPS, Bluetooth, WiFi), an optical sensor (e.g., a camera), a depth sensor, an orientation sensor (e.g., a gyroscope, inertial measurement unit), an audio sensor (e.g., a microphone), or any suitable combination thereof. It is noted that the sensors 402 described herein are for illustration purposes only and the sensors 402 are thus not limited to the ones described. The sensors 402 may be used to generate content data (e.g., video and audio data) and sensor data (e.g., orientation, location, user ID, physical object 102 identification).

The display 404 include a screen configured to display images generated by the processor 406. In one example, the display 404 includes at least a transparent display so that the user 105 can see through the display 404 (e.g., a head-up display).

The processor 406 includes an AR rendering module 418 and a remote expert application 424. The display application 412 generates augmented data in the display 404. The augmented data include, for example, virtual object renderings. In one embodiment, the display application 412 includes an augmented reality (AR) rendering module 218 and a remote expert application 424.

The AR rendering module 418 generates a virtual object 103 in the display 404. The AR rendering module 418 includes a local rendering engine that displays a three-dimensional virtual object 103 overlaid on (e.g., superimposed upon, or otherwise displayed in tandem with or in a line of sight of the user 105) an image (or a view) of the physical object 102 captured by a camera of the wearable device 106 in the display 404. For example, the virtual object 103 may include virtual knobs located on a physical door to illustrate where the knob is to be installed. In another example, the virtual object 103 may include colored wiring schematics. The visualization of the three-dimensional virtual object 103 may be manipulated by adjusting a position of the physical object 102 (e.g., its physical location 104, orientation, or both) relative to the camera of the wearable device 106. Similarly, the visualization of the three-dimensional virtual object 103 may be manipulated by adjusting a position of a camera of the wearable device 106 relative to the physical object 102.

In one example embodiment, the AR rendering module 418 may retrieve three-dimensional models of virtual objects 103 associated with the physical object 102. For example, the physical object 102 includes a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object 103 (e.g., an image that has been previously determined to correspond to the three-dimensional virtual object 103).

In one example embodiment, the AR rendering module 418 includes a function module that identifies the physical object 102 (e.g., a physical telephone), accesses virtual functions (e.g., increasing or decreasing the volume of a nearby television) associated with physical manipulations of the physical object 102 (e.g., lifting a physical telephone handset), and generates a virtual function corresponding to a physical manipulation of the physical object 102.

The remote expert application 424 records data (e.g., video data) from sensors 402 and communicates the recorded data from the wearable device 106 to the server 112. For example, the remote expert application 424 provides a real-time video feed to the server 112. In one example embodiment, the remote expert application 424 sends images and/or video frames captured using the camera from the sensors 402. In another example, the remote expert application 424 sends a video feed based on video captured using the sensors 402. The remote expert application 424 determines the geographic location and the orientation of the wearable device 106. The geographic location may be determined using GPS, WiFi, audio tone, light reading, and other means. The orientation may be determined using an internal compass and an accelerometer in the wearable device 106 to determine where the wearable device 106 is located and in which direction the wearable device 106 is oriented.

The remote expert application 424 further enables the user 105 to request for assistance related to the task (e.g., repairing the physical object 102) assigned to the user 105. The remote expert application 424 generates a request signal to the server 112 based on the location 104 (e.g., building A) of the user 105, an identification (e.g., apprentice electrician with expertise level A) of the user 105, or an operating status of the physical object 102 (e.g., malfunction X requires an electrician with at least an expertise level B).

In another example, if the user 105 needs help in fixing or studying the physical object 102, the remote expert application 424 communicates with the remote expert server 112 to seek assistance from an expert 107 related to the physical object 102. The remote expert application 424 may communicate data, including a video feed of the physical object 102 and virtual objects 103 rendered by the AR rendering module 418, to the remote expert server 112. The remote expert server 112 may relay the information to the corresponding client device 108 of the expert 107. Furthermore, the remote expert application 224 can modify a visualization of the virtual objects 103 based on identified manipulations of the virtual objects 103 from the client device 108 of the expert 107. For example, the expert 107 may modify or add a virtual object 103 to highlight a particular area of the physical object 102. The client device 108 may communicate the modified or added virtual object 103 to the remote expert application 424 via the server 112.

In another example, the virtual objects 103 generated by the AR rendering module 418 are shared and any modification of the virtual objects 103 may be synchronized and shared between the wearable device 106 of the user 105 and the client device 108 of the expert 107.

In another example, the remote expert application 424 accesses and retrieves a pre-recorded video from an expert 107. The material from the pre-recorded video is synchronized with the content data from the wearable device 106 based on the sensor data from sensors 402 of the wearable device 106 and from sensors 202 of the client device 108.

In another example, the remote expert application 424 accesses a live video feed from an expert 107. For example, the remote expert application 424 displays, in the display 404 of the wearable device 106, a live video from the expert 107 showing how to repair a machine. The live video may show the expert 107 fixing an actual physical machine 102 or a virtual machine 103 related to the physical object 102. In another example, the remote expert application 424 displays an annotated video from the expert 107. For example, the annotated video may be based on a video feed from the wearable device 106 where the expert 107 has annotated or provided comments on the original video feed from the wearable device 106. In other examples, the remote expert application 424 displays graphics animations illustrating how to fix the physical object 102.

The storage device 408 may be similar to the storage device 208 of FIG. 2. The storage device 408 may store video recordings from the wearable device 106 and from the client device 108, playback parameters, and augmented reality content provided by the server 112 and the client device 108.

Any one or more of the modules described herein may be implemented using hardware (e.g., a processor 406 of a machine) or a combination of hardware and software. For example, any module described herein may configure a processor 406 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5A:
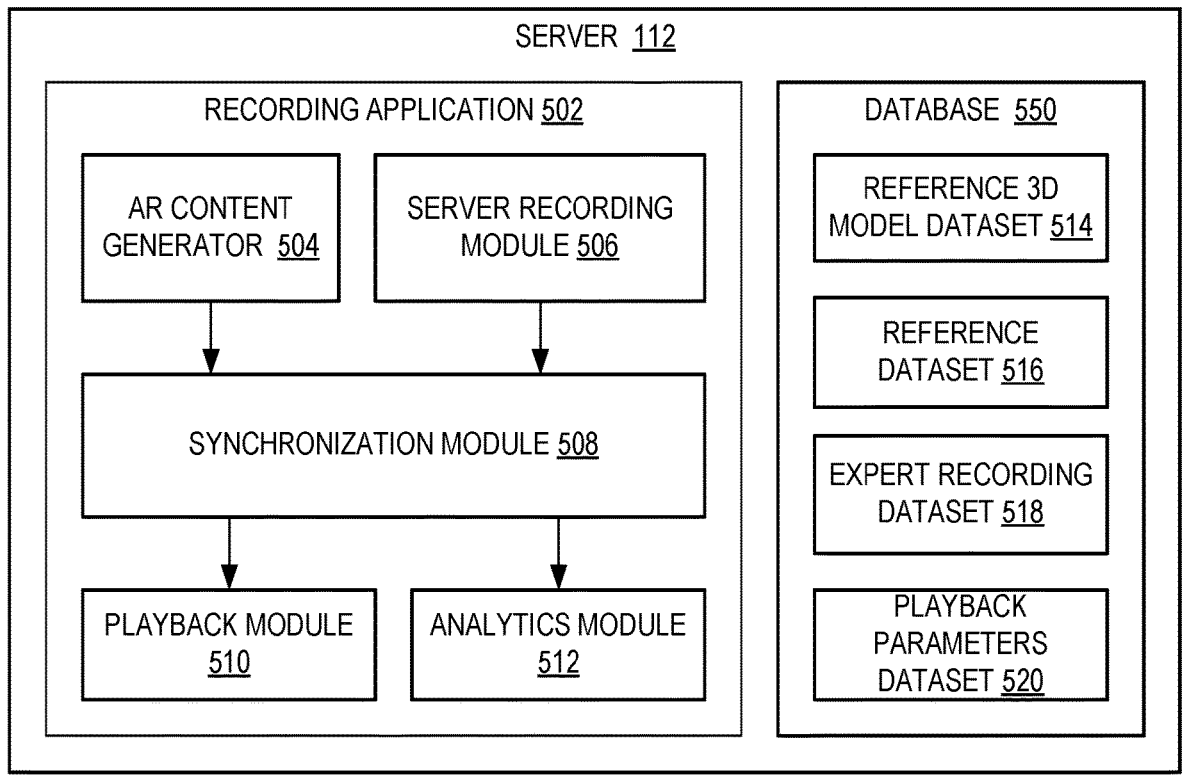
FIG. 5A is a block diagram illustrating an example embodiment of a server.

FIG. 5A is a block diagram illustrating modules (e.g., components) of the server 112. The server 112 communicates with both devices 106 and 108 to record and provide expert sessions (e.g., recordings). The server 112 includes a recording application 502 and a database 550. The recording application 502 includes an AR content generator 504, a server recording module 506, a synchronization module 508, a playback module 510, and an analytics module 512. The database 550 includes a reference 3D model dataset 514, a reference dataset 516, an expert recording dataset 518, and a playback parameters dataset 520.

The AR content generator 504 generates three-dimensional models of virtual objects 103 based on the physical object 102 detected by the wearable device 106. The AR content generator 504 generates a model of a virtual object 103 to be rendered in the display 204 of the wearable device 106 based on a position of the wearable device 106 relative to the physical object 102. A physical movement of the physical object 102 is identified from an image captured by the wearable device 106. The AR content generator 504 may also determine a virtual object 103 corresponding to the tracking data (either received from the wearable device 106 or generated externally to the wearable device 106) and render the virtual object 103. Furthermore, the tracking data may identify a real-world object being looked at by the user 105 of the wearable device 106. The virtual object 103 may include a virtual object 103 that can be manipulated (e.g., moved by the user 105 or expert 107) or display augmented information associated with such. A virtual object 103 may be manipulated based on the user 105's interaction with the physical object 102. For example, the user 105 may view the physical object 102 and the virtual object 103 from an AR wearable device (e.g., helmet, visor, eyeglasses) and manipulate the virtual object 103 by moving the AR wearable device around, closer, or father from the physical object 102. In another example, the user 105 manipulates the virtual object 103 via a touchscreen of the AR wearable device. For example, the user 105 may rotate a view of the virtual object 103 by swiping the touchscreen.

The server recording module 506 identifies the manipulation of the virtual object 103 by the wearable device 106 of the user 105 and communicates the manipulation to the client device 108 of the expert 107. For example, the virtual object 103 displayed at the client device 108 of the expert 107 moves based on the user 105 manipulating the virtual object 103. In another example, the server recording module 506 identifies the manipulation of the virtual object 103 by the client device 108 of the expert 107 and communicates the manipulation to the wearable device 106 of the user 105. For example, the virtual object 103 displayed at the wearable device 106 of the user 105 moves based on the expert 107 manipulating the virtual object 103.

Figure 5B:
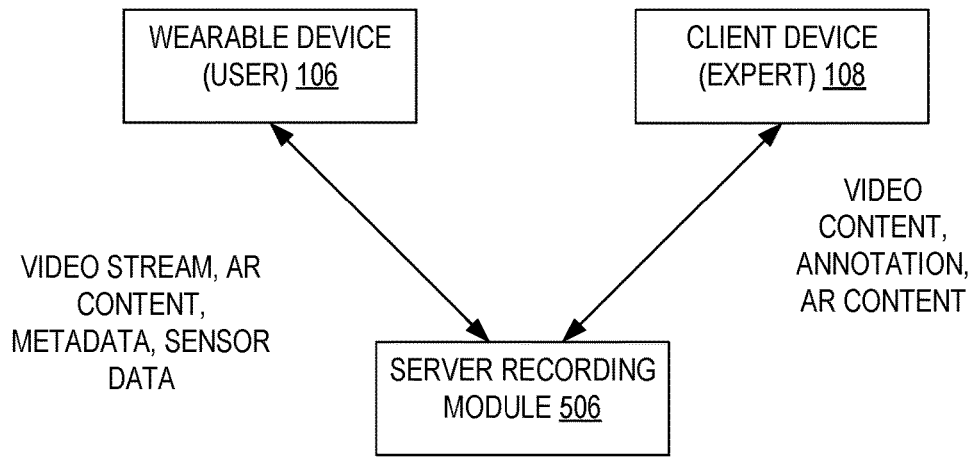
FIG. 5B is a block diagram illustrating an example embodiment of an operation of a recording application of the server of FIG. 5A.

The server recording module 506 receives content data and sensor data from devices 106 and 108 as illustrated in FIG. 5B. For example, the server recording module 506 receives a video stream, metadata (e.g., format, time stamp), sensor data, AR content from the wearable device 106 of the user 105. The server recording module 506 receives, for example, video content, annotated video content, graphics content, and AR content from the client device 108 of the expert 107.

The synchronization module 508 aggregates the data (content data, sensor data, manipulation data) from the AR content generator 504 and the server recording module 506 and organizes/catalogs the data based on the sensor data (e.g., content is organized by time stamp) for later playback.

The playback module 510 generates and displays an animation of the AR content from data from the synchronization module 508. The playback module 510 generates a visualization of the manipulation of the virtual objects 103 for display in devices 106, 108. For example, the expert 107 may move virtual objects 103 to show how to disassemble parts of an air conditioning unit. The server recording module 506 may record the movement of the virtual objects 103 and generate an animation based on the movement of the virtual objects 103. The playback module 510 triggers the animation to be displayed when playback parameters are met. For example, the animation is triggered in the wearable device 106 of the user 105 when the playback module 510 determines that the user 105 is a novice electrician and the repair task level of the physical object 102 requires an expert level electrician. The animation is displayed in the wearable device 106 of the user 105.

The analytics module 512 performs analytics of the data from the synchronization module 508. For example, analytics may be performed to determine which machines require the most expert assistance or which tasks require the least expert assistance.

The database 550 stores a reference 3D model dataset 514, a reference dataset 516, an expert recording dataset 518, and a payback parameters dataset 520. The 3D model dataset 514 includes references (e.g., unique pattern or machine-vision enabled references) related to the physical object 102. For example, the reference 3D model dataset 514 includes a 3D model of the completed physical object 102 and other objects related to the physical object 102. For example, the reference 3D model dataset 514 may include a 3D model of a machine. The reference dataset 516 includes, for example, building codes, schematics, maps, wiring diagrams, building processes, inventory lists of materials, specifications of building materials, descriptions of tools used in the processes related to the construction of a building, and information about the expertise of each construction worker.

The expert recording dataset 518 stores the data and sensor content received from the devices 106, 108. The playback parameters dataset 520 stores playback parameters from the playback module 510. For example, the playback parameters identify a video content portion associated with a combination of a task, a machine identification, a user identification, and a location 104.

Figure 6A:
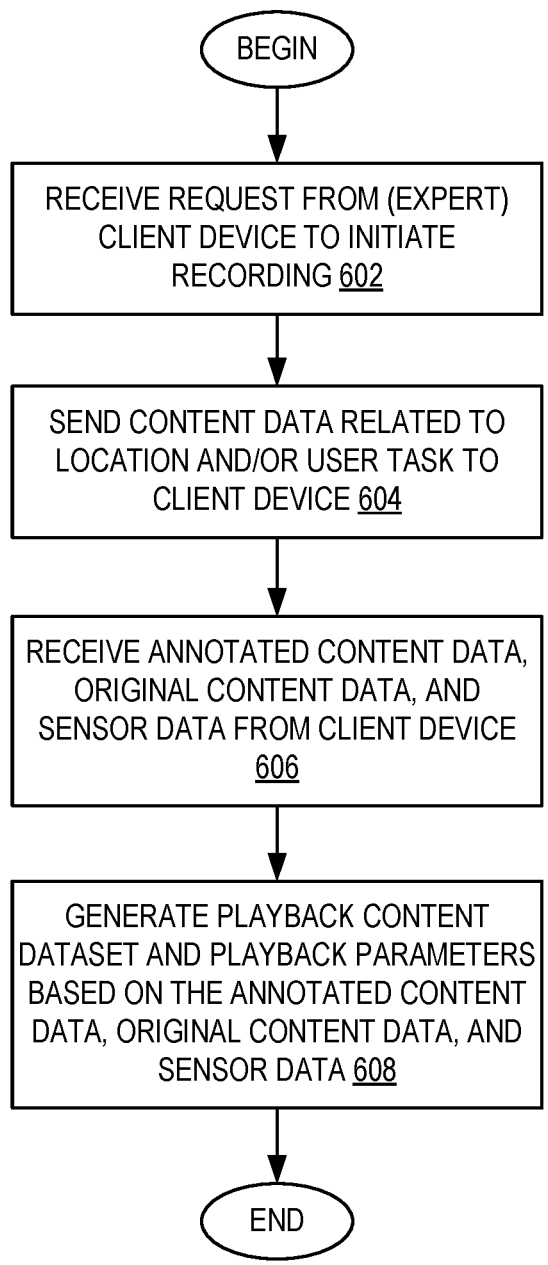
FIG. 6A is a flowchart illustrating an example embodiment of a method for generating playback content.

FIG. 6A is a flowchart illustrating an example embodiment of a method for generating playback content. At operation 602, the server 112 receives, from the client device 108 of the expert 107, data including video feed, location 104, and orientation, and a request to initiate recording. At operation 604, the server 112 sends to the client device 108 content data related to location 104 and/or user task of the wearable device 106. At operation 606, the server 112 receives annotated content data (e.g., annotations on the video feed from the wearable device 106), original content data (e.g., video, graphics), and sensor data from the client device 108 of the expert 107. At operation 608, the server 112 generates a playback content dataset and playback parameters based on the annotated content data, original content data, and sensor data.

Figure 6B:
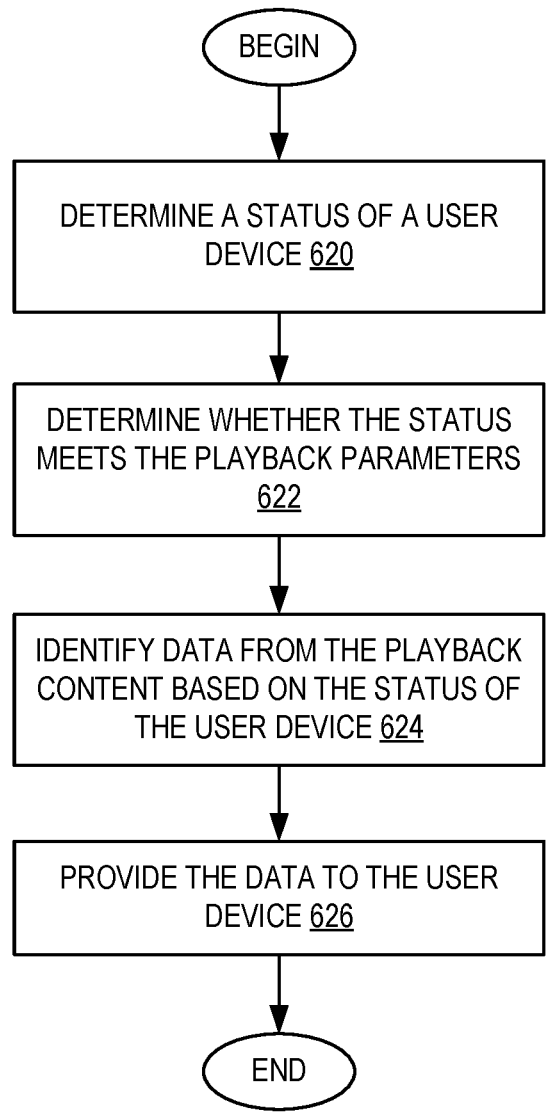
FIG. 6B is a flowchart illustrating an example embodiment of a method for identifying playback content.

FIG. 6B is a flowchart illustrating an example embodiment of a method for identifying playback content. At operation 620, the server 112 determines a status (e.g., task assigned to the user 105, location 104, physical objects 102 detected, identity of the user 105) of the wearable device 106. At operation 622, the server 112 determines whether the status of the wearable device 106 meets the playback parameters (e.g., fixing physical object 102 requires a minimum expertise level of the user 105). At operation 624, the server 112 identifies data (e.g., video portion, AR animation sequence) from the playback content based on the status of the wearable device 106. At operation 626, the server 112 provides the playback data to the wearable device 106.

Figure 6C:
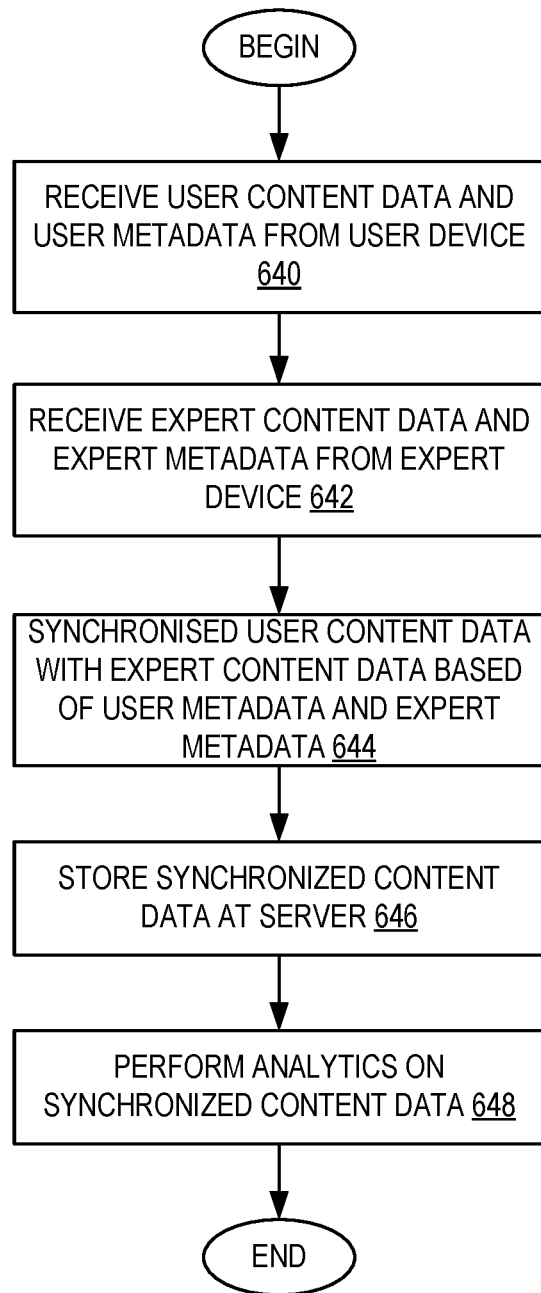
FIG. 6C is a flowchart illustrating an example embodiment of a method for storing playback content.

FIG. 6C is a flowchart illustrating an example embodiment of a method for storing playback content. At operation 640, the server 112 receives content data and sensor data from the wearable device 106. At operation 642, the server 112 receives content data and sensor data from the client device 108. At operation 644, the server 112 aggregates the content data and sensor data and synchronizes the content data based on the sensor data. At operation 646, the server 112 stores the synchronized content data. At operation 648, the server 112 performs analytics on the synchronized content data.

Figure 7A:
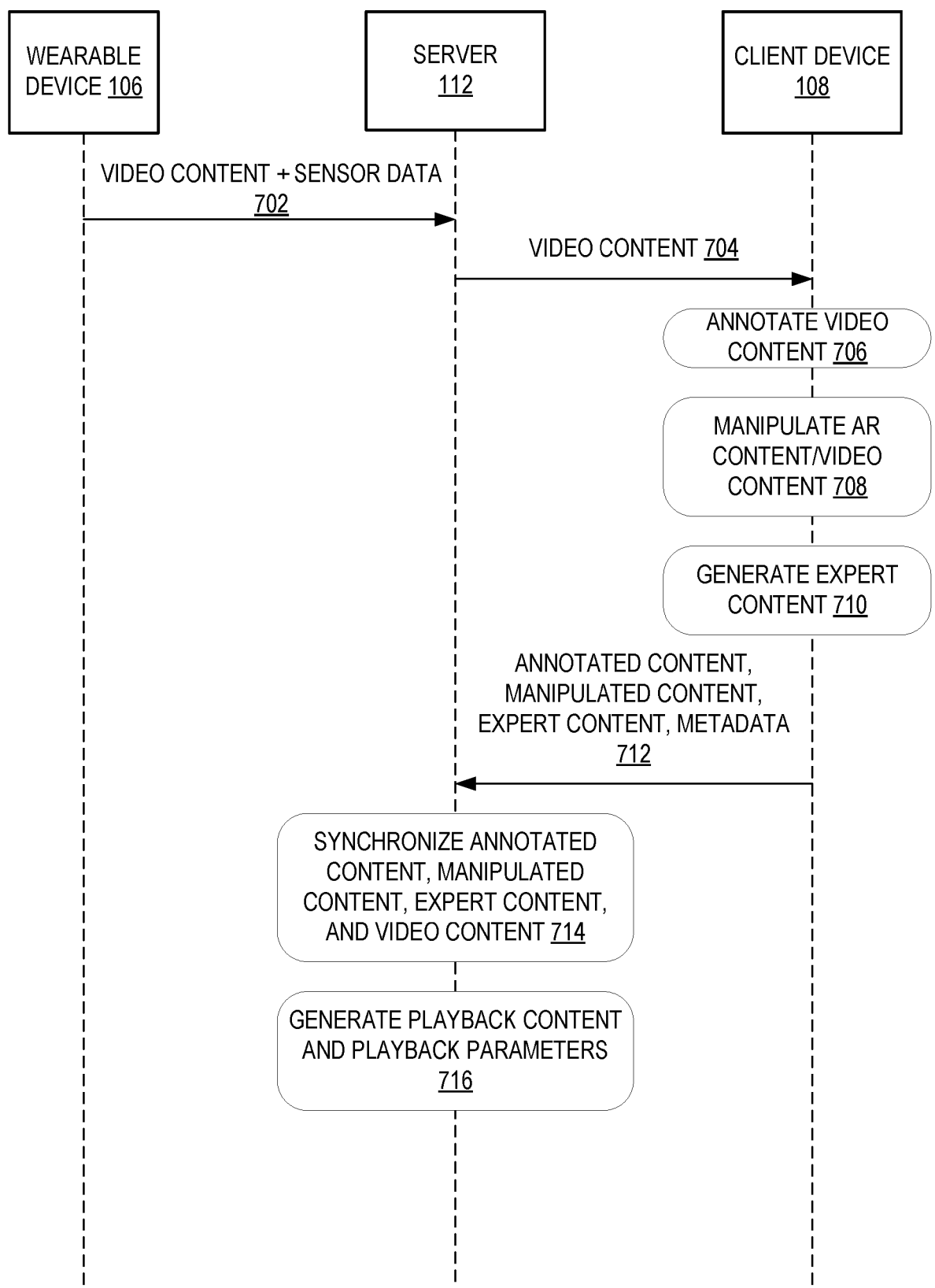
FIG. 7A is a ladder diagram illustrating an example embodiment of a method for generating playback content.

FIG. 7A is a ladder diagram illustrating an example embodiment of operating the server 112. At operation 702, the wearable device 106 communicates content data (e.g., video feed) and sensor data (e.g., location 104 and orientation) to the server 112. At operation 704, the server 112 identifies the expert 107 and communicates the content data to the client device 108 of the expert 107. At operation 706, the expert 107 annotates the content data. At operation 708, the expert 107 can also manipulate AR content and video content. At operation 710, the client device 108 can also generate original content. At operation 712, the client device 108 sends the annotated content, manipulated content, expert content, and sensor data to the server 112. At operation 714, the server 112 synchronizes the content data and sensor data from the wearable device 106 with content data and sensor data from the client device 108. At operation 716, the server 112 generates playback content and playback parameters based on the synchronized content and sensor data.

Figure 7B:
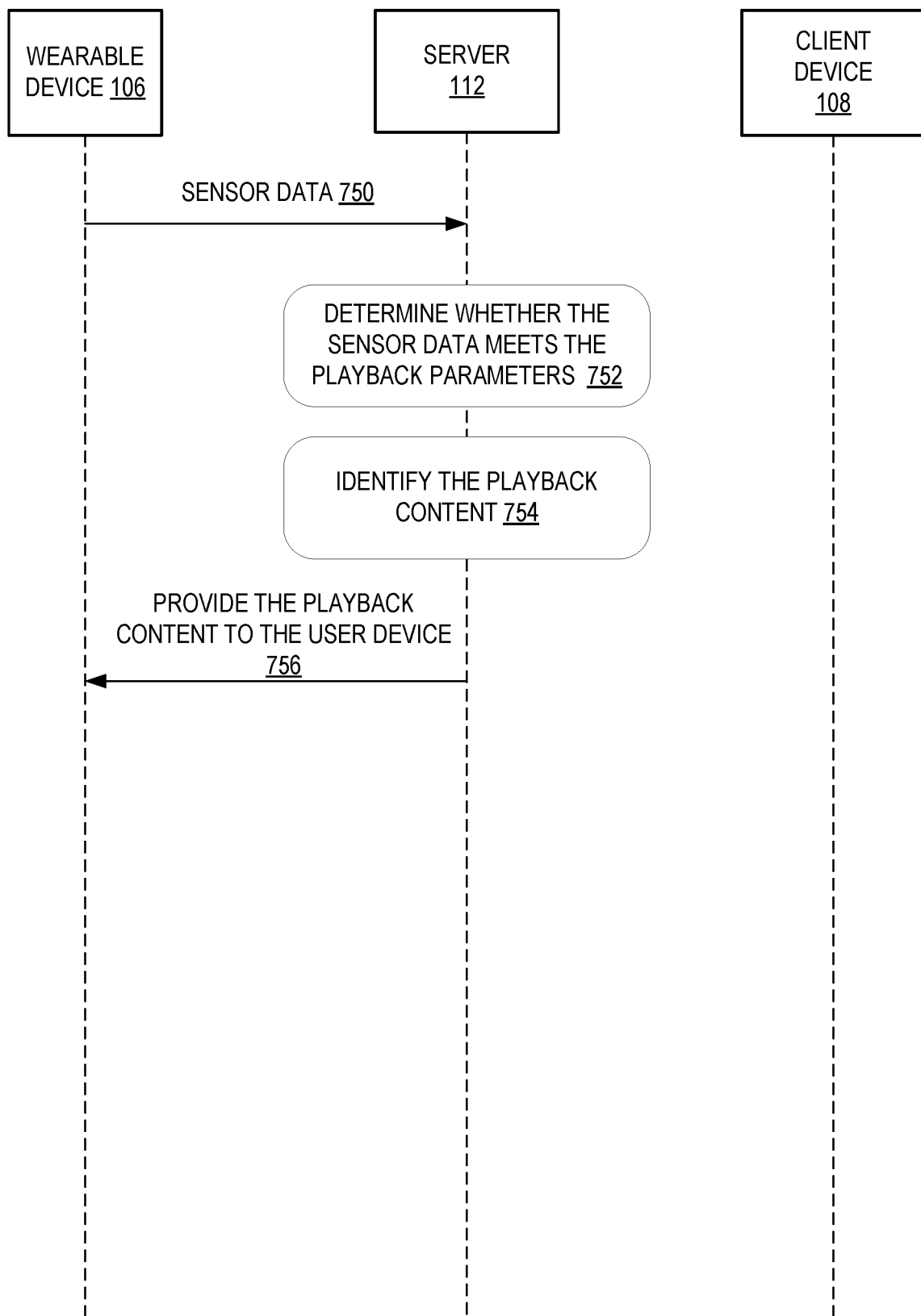
FIG. 7B is a ladder diagram illustrating an example embodiment of a method for identifying playback content.

FIG. 7B is a ladder diagram illustrating an example embodiment of a method for identifying playback content. At operation 750, the wearable device 106 communicates sensor data (e.g., location 104 and orientation, user task, physical object 102) to the server 112. At operation 752, the server 112 determines whether the sensor data meets the playback parameters. At operation 754, the expert 107 identifies the playback content based on the sensor data. At operation 756, the server 112 provides the corresponding playback content to the wearable device 106.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client device 108, or server computer system) or one or more hardware modules of a computer system (e.g., a processor 406 or a group of processors 406) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 406 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 406 configured using software, the general-purpose processor 406 may be configured as respective different hardware modules at different times. Software may accordingly configure a processor 406, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 406 that are temporarily configured (e.g., by software) or permanently configured to perform the relevant operations. Whether temporarily or permanently configured, such processors 406 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 406 or processor-implemented modules. The performance of certain of the operations may be distributed among the one or more processors 406, not only residing within a single machine, but deployed across a number of machines. In some example embodiments, the processor or processors 406 may be located in a single location 104 (e.g., within a home environment, an office environment, or a server farm), while in other embodiments the processors 406 may be distributed across a number of locations 104.

The one or more processors 406 may also operate to support performance of the relevant operations in a "cloud computing" environment or as a "software as a service" (SaaS). For example, at least some of the operations may be performed by a group of computers (as examples of machines including processors 406), these operations being accessible via a network and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor 406, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 406 executing a computer program to perform functions by operating on input data and generating output. Method operations can also be performed by, and apparatus of example embodiments may be implemented as, special purpose logic circuitry (e.g., an FPGA or an ASIC).

A computing system can include the client device 108 and the server 112. The client device 108 and server 112 are generally remote from each other and typically interact through a communication network. The relationship of client device 108 and the server 112 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 406), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
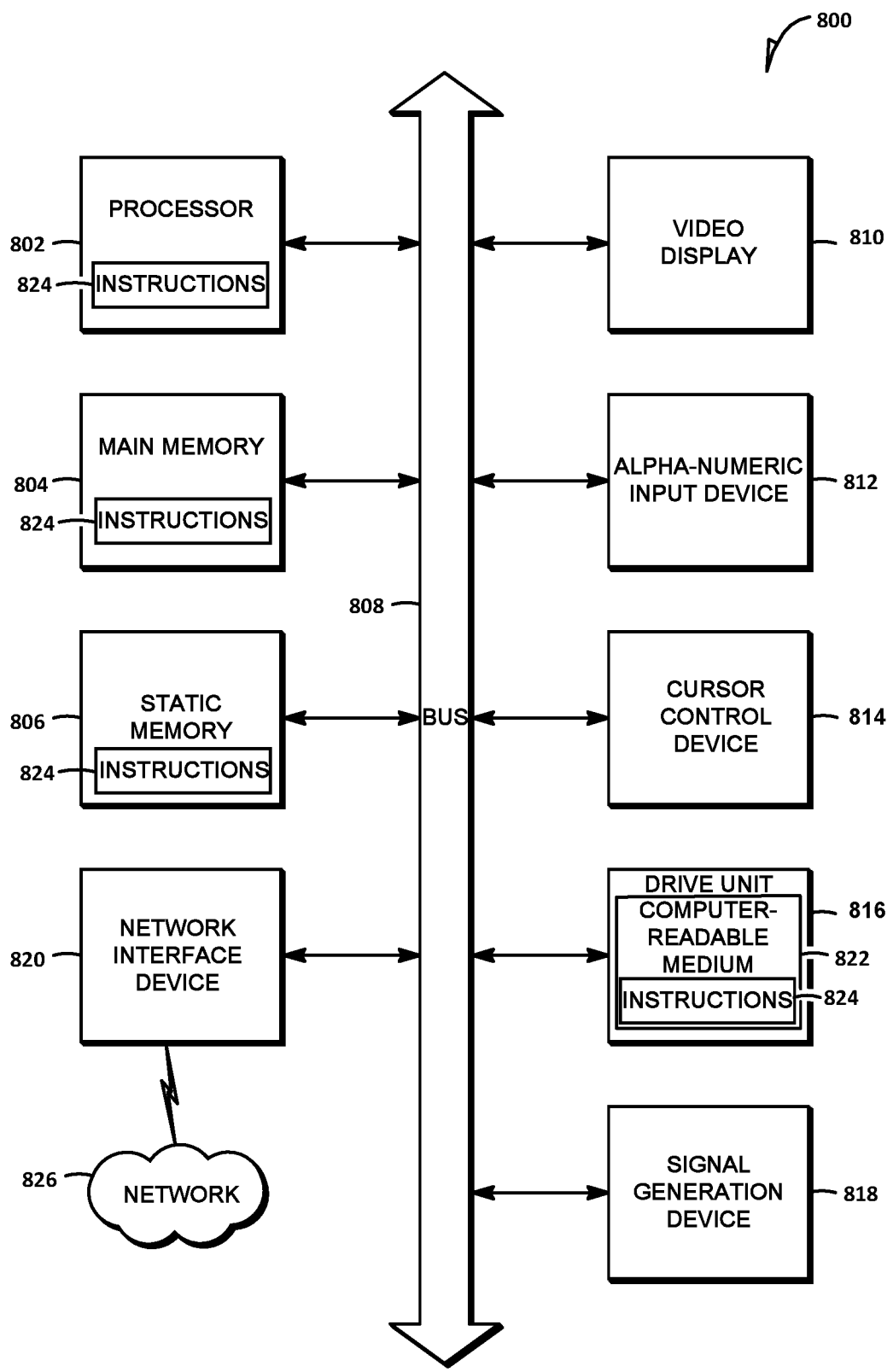
FIG. 8 is a block diagram illustrating components of a machine, according to some example embodiments, able to read instructions from a machine-readable medium and perform any one or more of the methodologies discussed herein.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a remote expert server 112 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a drive unit 816, a signal generation device 818 (e.g., a speaker) and a network interface device 820.

Machine-Readable Medium

The drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers 112) that store the one or more instructions 824 or data structures. The term "machine-readable medium" shall also be taken to include any tangible medium that is capable of storing, encoding or carrying instructions 824 for execution by the machine and that cause the machine to perform any one or more of the methodologies of the present embodiments, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disk read-only memory (CD-ROM) and digital versatile disk (or digital video disk) read-only memory (DVD-ROM) disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 824 for execution by the machine, and includes digital or analog communications signals or other intangible media to facilitate communication of such software.

Example Mobile Device

Figure 9:
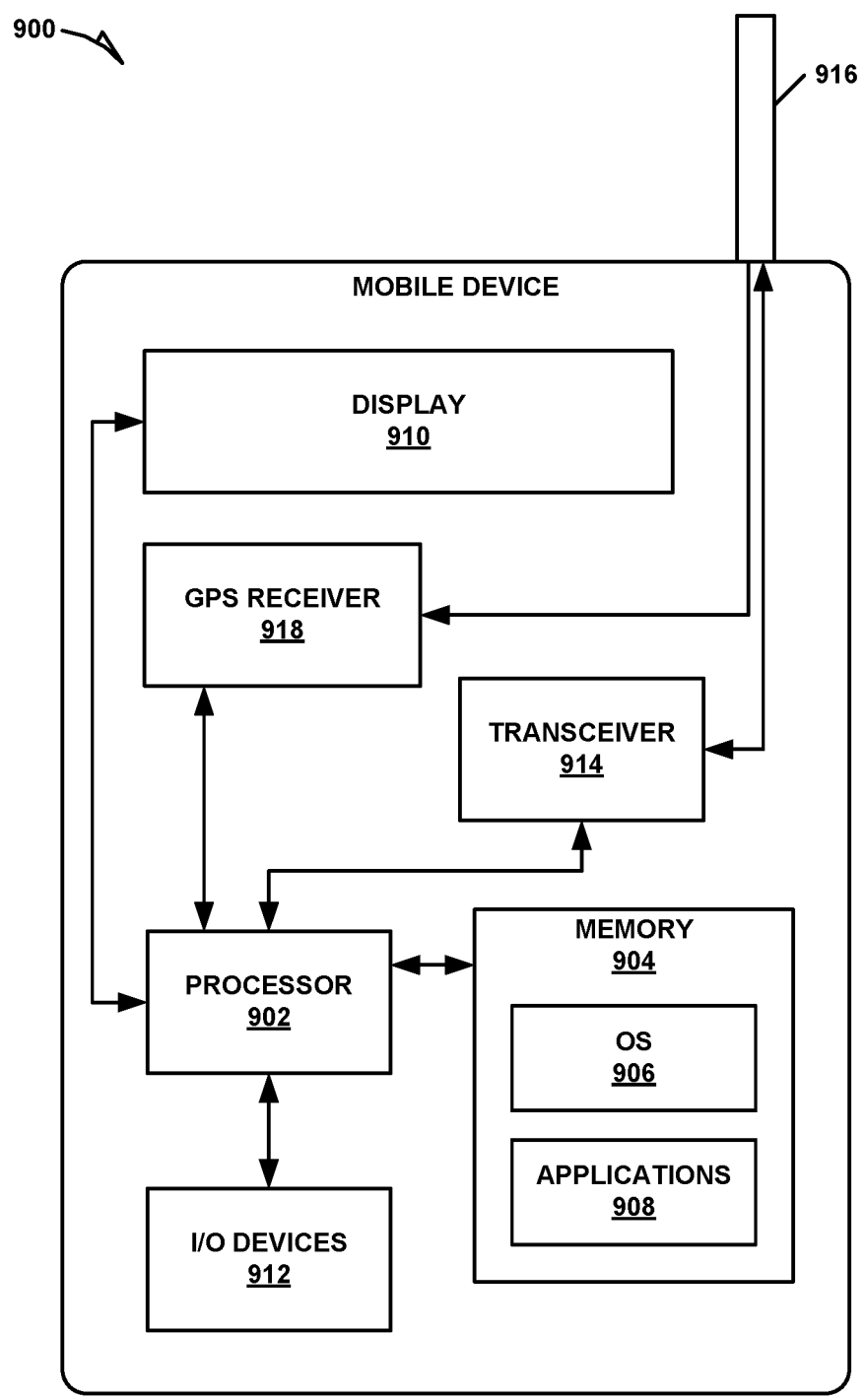
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide location-based services (LBSs) to a user 105. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The following enumerated embodiments describe various example embodiments of methods, machine-readable media 822, and systems (e.g., machines, devices, or other apparatus) discussed herein.

A first example provides a server comprising:
one or more hardware processor comprising a recording application, the recording application configured to perform operations comprising:
receiving, from a first display device of a first user, first content data, first sensor data, and a request for assistance identifying a context of the first display device;
identifying a second display device of a second user based on the context of the first display device;
providing the first content data and the first sensor data to the second display device;
receiving second content data and second sensor data from the second display device, the second content data including modifications to the first content data;
synchronizing the first content data with the second content data based on the first and second sensor data;
forming playback parameters based on the context of the first display device;
generating an enhanced playback session using the synchronized first and second content data in response to determining that the first sensor data meet the playback parameters; and
communicating the enhanced playback session to the first display device, the enhanced playback session rendered at the first display device.

A second example provides a server according to any one of the above examples, further comprising:
a storage device configured to store the enhanced playback session, the playback parameters, the first and second content data, and the first and second sensor data,
wherein the first or second display device comprises a head mounted device (HMD) including an augmented reality (AR) application, the AR application configured to display the enhanced playback session in a display of the first or second display device.

A third example provides a server according to any one of the above examples, wherein the context of the first display device is based on at least one of the first sensor data, a task of the user, an identity of the first user, and a time parameter.

A fourth example provides a server according to any one of the above examples, wherein the first content data of the first display device comprise at least one of video data, image data, audio data, graphic data, and three-dimensional model data.

A fifth example provides a server according to any one of the above examples, wherein the first sensor data of the first display device comprise at least one of geographic data, inertia data, and orientation data.

A sixth example provides a server according to any one of the above examples, wherein the second content data of the second display device comprise at least one of video data, image data, audio data, graphic data, three-dimensional model data.

A seventh example provides a server according to any one of the above examples, wherein the second content data of the second display device comprise at least one of annotation data related to the first content data, and manipulation data related to the second user manipulating a three-dimensional model of a physical object identified in the first content data.

An eighth example provides a server according to any one of the above examples, wherein the playback parameters comprise at least one of a location parameter, a user parameter, and a task parameter.

A ninth example provides a server according to any one of the above examples, wherein the enhanced playback session comprises a video recording synchronized to a user task in the context of the first display device.

A tenth example provides a server according to any one of the above examples, wherein the operations further comprises:

identifying a manipulation of virtual objects displayed in the second display device, the virtual objects rendered based on a physical object viewed by the first display device, the virtual objects displayed in the first display device in relation to a reference object viewed with the first display device; and displaying the manipulation of the virtual objects at the first display device.

What is claimed is:

1. A method comprising:
   communicating, to a server, data identifying a task related to a physical object, the server being configured to determine that a set of playback parameters for the physical object have been satisfied based on the data; and
   in response to communicating the data and the server determining that the set of playback parameters for the physical object have been satisfied, accessing a playback session generated based on enhanced content data associated with the set of playback parameters, the enhanced content data including content generated by a first client device that is modified based on annotations received from a second client device, the annotations describing performance of the task in relation to the physical object.

2. The method of claim 1, further comprising:
   identifying, at the client device, an orientation of the client device relative to the physical object, wherein the data indicates the orientation of the client device relative to the physical object,
   wherein the server is configured to determine that the set of playback parameters have been satisfied based on the task and the orientation of the client device.

3. The method of claim 1, further comprising:
   communicating, to a server, the set of playback parameters; and
   receiving, from the server, the playback session.

4. The method of claim 3, wherein the server is configured to:
   receive content from the first client device, the content being associated with performance of the task in relation to the physical object;
   provide the content to the second client device;
   receive, from the second client device, the annotations describing performance of the task in relation to the physical object; and
   form the set of playback parameters based on an orientation of the first client device relative to the physical object.

5. The method of claim 4, wherein the content includes sensor data and a request for assistance performing the task, wherein the second client device is identified based on the request for assistance.

6. The method of claim 5, wherein the annotations received from the second client device includes second sensor data describing modifications to the content.

7. The method of claim 4, wherein the content generated by the first client device comprises at least one of video data, image data, audio data, graphic data, and three-dimensional model data.

8. The method of claim 4, wherein the annotations received from the second client device comprises at least one of video data, image data, audio data, graphic data, three-dimensional model data, wherein the set of playback parameters comprise at least one of a location parameter, a user parameter, and a task parameter.

9. The method of claim 1, wherein the playback session comprises one of a video recording synchronized to a context of the client device, or an augmented reality content synchronized to the context of the client device.

10. The method of claim 1, further comprising:
    communicating with the second client device in response to determining that the set of playback parameters have been satisfied.

11. A client device comprising:
    one or more computer processors; and
    one or more computer-readable mediums storing instructions that, when executed by the one or more computer processors, cause the client device to perform operations comprising:
    communicating, to a server, data identifying a task related to a physical object, the server being configured to determine that a set of playback parameters for the physical object have been satisfied based on the data; and
    in response to communicating the data and the server determining that the set of playback parameters for the physical object have been satisfied, accessing a playback session generated based on enhanced content data associated with the set of playback parameters, the enhanced content data including content generated by a first client device that is modified based on annotations received from a second client device, the annotations describing performance of the task in relation to the physical object.

12. The client device of claim 11, wherein the operations further comprise:
identifying, at the client device, an orientation of the client device relative to the physical object, wherein the data indicates the orientation of the client device relative to the physical object,
wherein the server is configured to determine that the set of playback parameters have been satisfied is based on the task and the orientation of the client device.

13. The client device of claim 11, wherein the operations further comprise:
receiving, from the server, the playback session.

14. The client device of claim 13, wherein the server is configured to:
receive content from the first client device, the content being associated with performance of the task in relation to the physical object;
provide the content to the second client device;
receive, from the second client device, the annotations describing performance of the task in relation to the physical object; and
form the set of playback parameters based on an orientation of the first client device relative to the physical object.

15. The client device of claim 14, wherein the content includes sensor data and a request for assistance performing the task, wherein the second client device is identified based on the request for assistance.

16. The client device of claim 15, wherein the annotations received from the second client device includes second sensor data describing modifications to the content.

17. The client device of claim 14, wherein the content generated by the first client device comprises at least one of video data, image data, audio data, graphic data, and three-dimensional model data.

18. The client device of claim 14, wherein the annotations received from the second client device comprises at least one of video data, image data, audio data, graphic data, three-dimensional model data, wherein the set of playback parameters comprise at least one of a location parameter, a user parameter, and a task parameter.

19. The client device of claim 11, wherein the playback session comprises one of a video recording synchronized to a context of the client device, or an augmented reality content synchronized to the context of the client device.

20. A non-transitory computer-readable medium storing instructions that, when executed by one or more computer processors of one or more computing devices, cause the one or more computing devices to perform operations comprising:
communicating, to a server, data identifying a task related to a physical object, the server being configured to determine that a set of playback parameters for the physical object have been satisfied based on the data; and
in response to communicating the data and the server determining that the set of playback parameters for the physical object have been satisfied, accessing a playback session generated based on enhanced content data associated with the set of playback parameters, the enhanced content data including content generated by a first client device that is modified based on annotations received from a second client device, the annotations describing performance of the task in relation to the physical object.

* * * * *

UNITED STATES PATENT AND TRADEMARK OFFICE
CERTIFICATE OF CORRECTION

PATENT NO. : 11,678,004 B2
APPLICATION NO. : 17/649973
DATED : June 13, 2023
INVENTOR(S) : Brian Mullins Page 1 of 1

It is certified that error appears in the above-identified patent and that said Letters Patent is hereby corrected as shown below:

In the Claims

In Column 22, Lines 2-3, in Claim 3, after "comprising:¶", delete "communicating, to a server, the set of playback parameters; and"

Signed and Sealed this
Twenty-second Day of October, 2024

Katherine Kelly Vidal
*Director of the United States Patent and Trademark Office*